Figure 1:
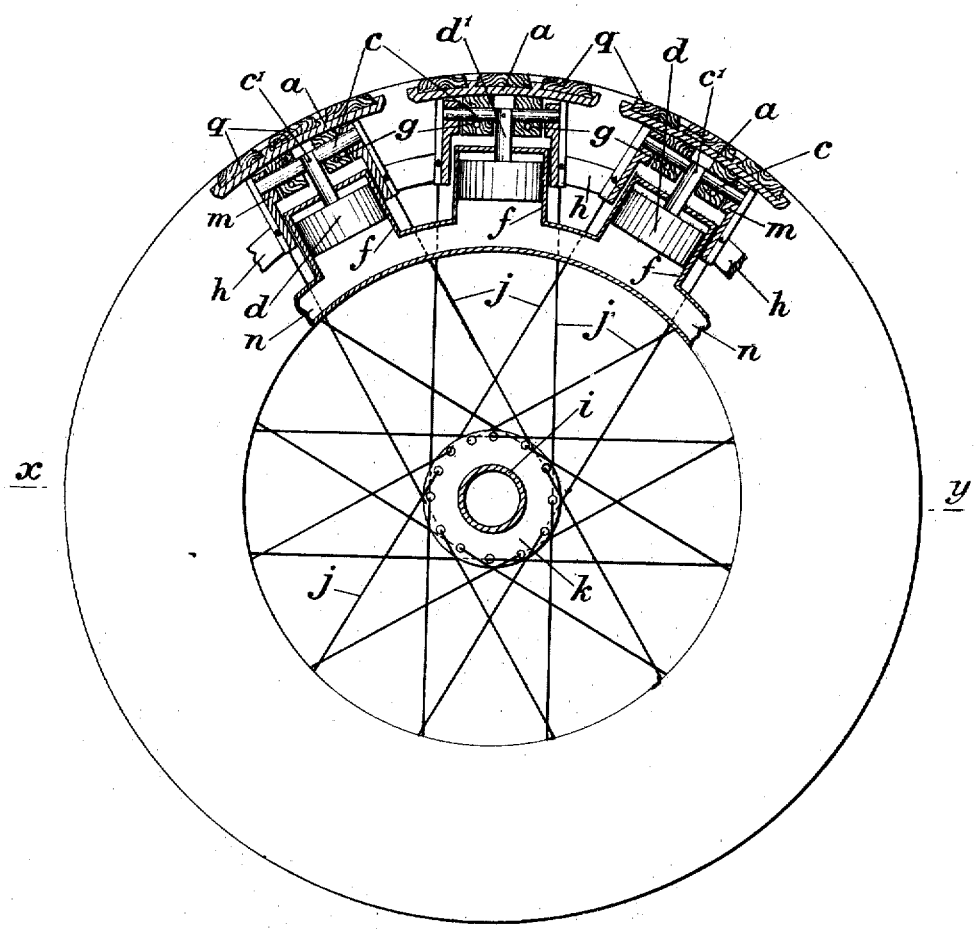

R. W. PRINGLE.
WHEEL.
APPLICATION FILED APR. 26, 1907.

912,615.

Patented Feb. 16, 1909.
3 SHEETS—SHEET 1.

Witnesses:—

Inventor,
Robert William Pringle,
by
Attorney.

UNITED STATES PATENT OFFICE.

ROBERT WILLIAM PRINGLE, OF LONDON, ENGLAND.

WHEEL.

No. 912,615.  Specification of Letters Patent.  Patented Feb. 16, 1909.

Application filed April 26, 1907. Serial No. 370,419.

*To all whom it may concern:*

Be it known that I, ROBERT WILLIAM PRINGLE, a subject of the King of Great Britain and Ireland, residing at Norfolk House, Laurence Pountney Hill, London, E. C., England, have invented certain new and useful Improvements in and Relating to Wheels, of which the following is a specification.

This invention relates to wheels for vehicles of all kinds and cycles and has for its object so to construct the wheel that it shall have the resiliency of a pneumatic tired wheel without its defects and be capable of application not only to cycles and light motor vehicles but also to motor busses and other heavy motor vehicles including traction engines and also to prevent side slip.

According to the invention I provide the wheel with a rim consisting of a number of independent rim segments which are so arranged as to be capable of slight and independent movement in a radial direction against the resistance of a fluid under pressure contained within a number of cylinders radially disposed. Each of the rim segments is connected to the hub in such a manner that the connecting member can only be subjected to tension, the rim segments being free to move radially inwards to a slight extent towards the hub under the elastic resistance of the fluid contained in the cylinders.

The cylinders are advantageously connected together by means of communicating tubes so as thus to constitute a continuous pneumatic cushion between the rim segments and the hub, indirectly connected to the latter by virtue of pressure exerted in every direction by the elastic fluid and by guides or slots in which the connecting members move, and also indirectly connected to the former in a manner that insures an elastic cushion for the rim. By these means the pressure on the rim segments in contact with the road surface is not transmitted direct to the hub of the vehicle but to the whole body of the compressed fluid, whereby shocks and vibrations communicated to the rim are absorbed before transmission to the tension members referred to.

The invention comprises the method of securing the rim segments to the pistons so as to allow of the respective segments assuming any particular angular position according to the inclination or contour of the road surface and yet transmitting the reaction through a plane at right angles to the axis of the wheel, and also comprises the method of connecting the rim segments to the hub, and other constructional features which are hereinafter described as applied. Some important advantages accrue from this method of constructing the wheel, viz:—
(a) The spokes are always in tension and therefore do not require to have nearly so great a cross-sectional area as in the usual construction of vehicle wheels where the spokes are usually in compression. (b) The rim segments or tread can be shod with hard wear resisting metal or material without injuriously affecting the surface of the road, as the pressure between the rim segments or tread and the road is transmitted through an elastic medium as aforesaid.

The invention is illustrated in the accompanying drawings in which—

Figure 2:
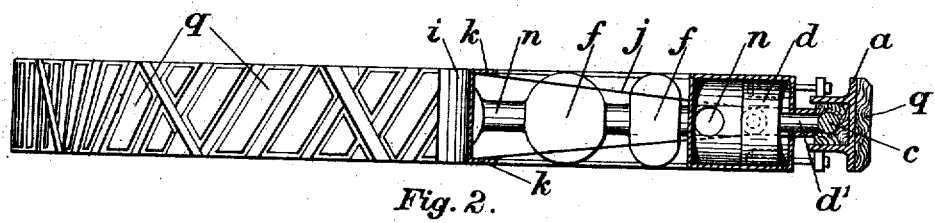
Figure 3:
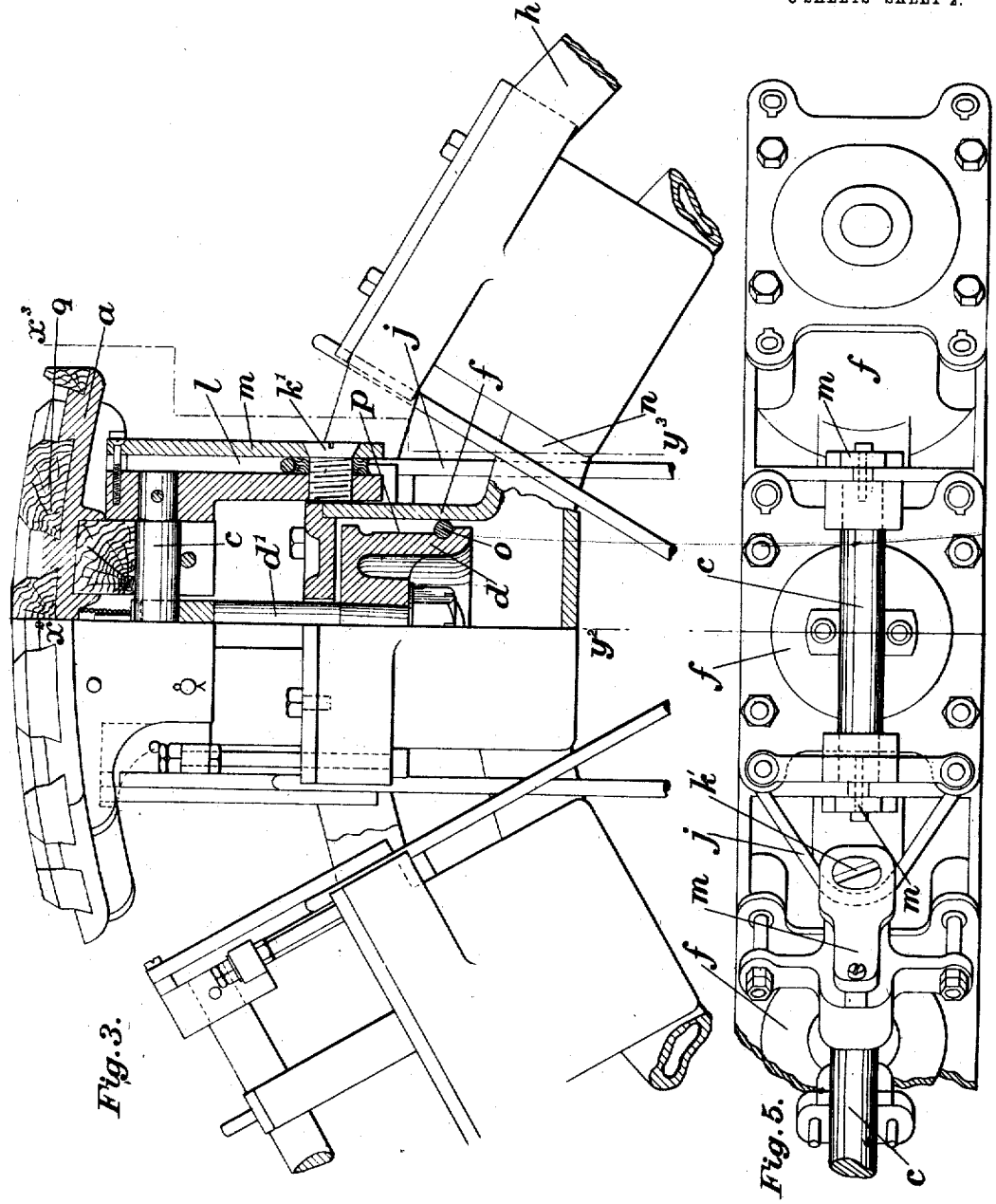
Figure 4:
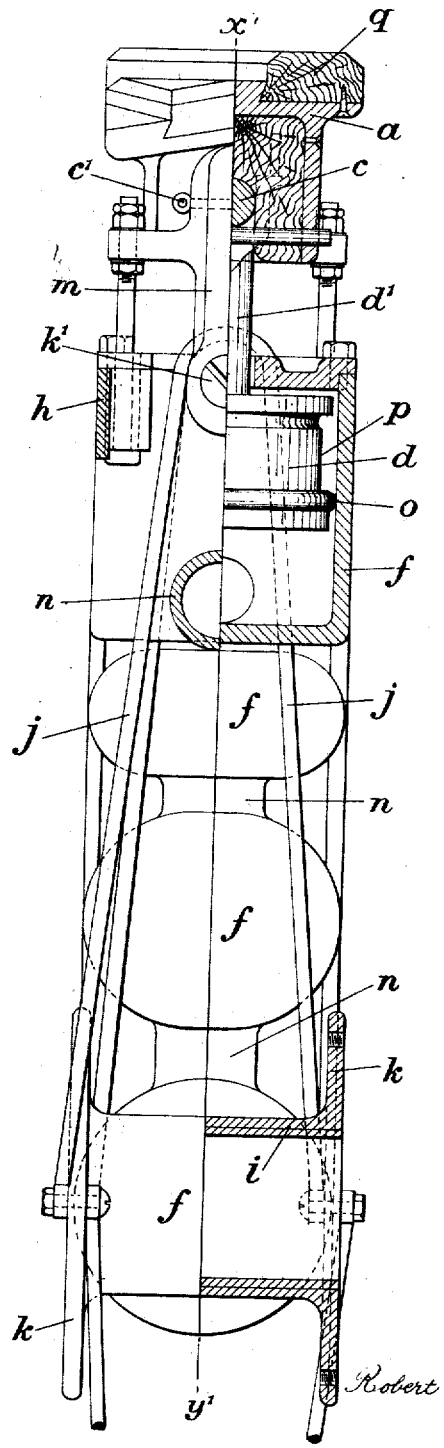

Figure 1 is a diagrammatic elevation partly in section of a vehicle wheel provided according to the invention showing only three of the cylinders employed. Fig. 2 is a diagrammatic plan of the same partly shown in section through the line $x y$ Fig. 1. Fig. 3 is a detail front elevation partly in section on the line $x' y'$ Fig. 4 of a portion of a wheel provided according to the invention. Fig. 4 is a detail side section, one-half being a section on the line $x^2 y^2$ Fig. 3 and the other half on the line $x^3 y^3$ Fig. 3, and Fig. 5 is a detail plan corresponding thereto.

In carrying the invention into effect according to a preferred construction the rim segments $a$, are so arranged that when no load is upon the wheel the pressure acts equally upon each piston $d$ and the segments $a$ forming the tread then form a true circle. The adjacent segments are each connected by means of a bolt $c$ and piston rod $d'$ to a separate piston $d$ working in a cylinder $f$ which bolt $c$ is embraced by respective lugs $g$ provided at right angles to the piston rod $d'$ and in the plane of the wheel upon the underside of the adjacent segments $a$ in such manner as to permit of a slight relative transverse rotation of each segment. A strengthening ring $h$ is advantageously provided integral with the cylinders $f$ and serves to take up lateral stress on the wheel. These bolts $c$ are respectively indirectly connected to the hub $i$ of the wheel by means of tangent tension rods $j$ whose extremities are secured to the flanges $k$ alternately inside and outside on each side of the hub $i$. These tension rods are provided so as to be capable of movement within slots $l$ formed in guide brackets $m$, and embrace set screws $k'$ screwed therein. These guide brackets $m$ surround the upper ends of the cylinders $f$ and serve as bearings for the bolts $c$. Each of the bolts $c$ is centrally but not rigidly connected by means of a pin joint $c'$ to the respective piston rod $d'$. The cylinders $f$ are connected together by a communicating pipe $n$ the cylinders $f$ and connecting pipes $n$ thus forming a pneumatic cushion device. It will thus be seen that outward pressure on any of the pistons $d$ is communicated through the corresponding bolt $c$ and rods $j$ to the hub, while the rim segments $a$ are free to move inwards to a slight extent against the resistance of the air or other fluid under pressure contained in the cylinder $f$.

The pistons $d$ preferably do not fit tightly in the cylinders $f$, nor do the piston rods $d'$ require to fit tightly in passing through the covers, leakage of air being prevented by means of a ring $o$ of rubber or other suitable material which surrounds each piston $d$, and lies within a wide groove $p$ formed on the periphery of the piston $d$ so that the ring of rubber $o$ may thus roll in the groove $p$ on the movement of the piston $d$. By the foregoing arrangement the use of lubricants other than graphite is obviated.

The rim segments $a$ are advantageously arranged so that the division between them is oblique to the edges of the rim and are shod with blocks $q$ of any suitable material such as wood, papier-mâché, rubber, or metal, the edges of which slope in the opposite direction.

The pivoting of the rim segments $a$ precludes the possibility of side slip, as on the slightest lateral movement of the wheel the surface of the blocks $q$ would assume a position parallel with the surface of the road and the resulting friction between the large surfaces in contact together with the resistance due to the oblique setting of the blocks $q$ would render lateral movement impossible.

The bearings of the rim segments $a$ are preferably made of hard wood, and graphite is used as a lubricant to prevent the formation of sticky mud formed of oil and dust on these bearings.

The wheel may be made up of two sets of rim segments $a$ and pistons $d$, or of one set and in the former arrangement the respective laterally adjacent rim segments $a$ are preferably set to break joint and the pistons $d$ of the respective sets of segments $a$ are disposed uniformly in the circle.

It will be understood that the principle of the invention can be applied to any wheel, from that of a bicycle to that of a locomotive the product of the combined area of the pistons and the pressure therein always being made equal to the axle load.

What I claim as my invention and desire to secure by Letters Patent is:—

1. In a vehicle wheel a series of rim segments in combination with a pneumatic device interposed between said rim segments and the hub and a series of tension members connecting said rim segments to the hub substantially as described.

2. In a vehicle wheel a series of rim segments in combination with a series of cylinders airtight pistons moving within the cylinders and connected to the respective rim segments and a series of tension members connecting said rim segments to the hub substantially as described.

3. In a vehicle wheel a series of rim segments mounted so as to be capable of transverse rotation in combination with a pneumatic device interposed between said rim segments and the hub and a series of tension members connecting said rim segments to the hub substantially as described.

4. In a vehicle wheel a series of rim segments mounted so as to be capable of transverse rotation a series of cylinders airtight pistons moving within the cylinders and connected to said rim regments and a series of tension members connecting said rim segments to the hub substantially as described.

5. In a vehicle wheel a series of rim segments a series of bolts to which said rim segments are respectively pivotally connected, a series of airtight pistons and piston rods respectively but not rigidly attached to said bolts, a series of cylinders within which said pistons move, and a series of tension members connecting said rim segments to the hub substantially as described.

6. In a vehicle wheel a series of rim segments a series of bolts to which said rim segments are pivotally connected, a series of airtight pistons and piston rods to which said bolts are respectively connected, a series of cylinders within which said pistons move and a series of tension members connecting said rim segments to the hub substantially as described.

7. In a vehicle wheel a series of rim segments respectively provided near each extremity with a projecting lug, a series of bolts embraced by said projecting lugs, a series of airtight pistons and piston rods to which said bolts are respectively connected, a series of cylinders within which said pistons move and a series of tension members connecting said segments to the hub substantially as described.

8. In a vehicle wheel a series of rim segments, a series of cylinders airtight pistons moving within the cylinders and connected to the said rim segments, a series of communicating pipes connecting said cylinders and a series of tension members connecting said rim segments to the hub substantially as described.

9. In a vehicle wheel a series of rim segments mounted so as to be capable of transverse rotation, a series of cylinders airtight pistons moving within the cylinders and connected to said rim segments a series of communicating pipes connecting said cylinders, and a series of tension members connecting said rim segments to the hub substantially as described.

10. In a vehicle wheel a series of rim segments, a series of bolts to which said rim segments are pivotally connected, a series of airtight pistons and piston rods to which said bolts are connected a series of cylinders within which said pistons move, a series of communicating pipes connecting said cylinders and a series of tension members connecting said rim segments to the hub substantially as described.

11. In a vehicle wheel a series of rim segments, a series of bolts to which said rim segments are pivotally connected, a series of airtight pistons and piston rods to which said bolts are respectively but not rigidly connected, a series of cylinders within which said pistons move, a series of communicating pipes connecting said cylinders and a series of tension members connecting said rim segments to the hub substantially as described.

12. In a vehicle wheel a series of rim segments respectively provided near each extremity with a projecting lug, a series of bolts embraced by said lugs, a series of airtight pistons and piston rods to which said bolts are connected, a series of cylinders within which said pistons move, a series of communicating pipes connecting said cylinders and a series of tension members connecting said rim segments to the hub substantially as described.

13. In a vehicle wheel a series of rim segments respectively provided near each extremity with a projecting lug, a series of bolts embraced by said lugs, a series of airtight pistons and piston rods to which said bolts are respectively but not rigidly connected, a series of cylinders within which said pistons move, a series of communicating pipes connecting said cylinders and a series of tension members connecting said rim segments to the hub substantially as described.

In testimony whereof I have hereunto signed my name to this specification in the presence of two subscribing witnesses.

ROBERT WILLIAM PRINGLE.

Witnesses:
H. D. JAMESON,
F. L. RAND.